United States Patent Office 3,523,214
Patented Aug. 4, 1970

3,523,214
MULTISTAGE FRAME TOWER FOR INSTALLA-
TION OF H.T. ELECTRICAL EQUIPMENT,
PREFERABLY BANKS OF CONDENSERS
Vitaly Evgenievich Beniaminson, Ul. Osipenko 3, kv. 2;
Evgeny Mikhailovich Bukharin, Pervomaiskaya ul. 73,
kv. 13; Vladimir Samuilovich Glik, Petrovka 19, kv.
52; Natalia Yakovlevna Timoshenko, Bolshaya Ekater-
ininskaya ul. 16, kv. 2; Anatoly Ivanovich Sheiko,
Nizhne-Krasnoselskaya ul. 45, kv. 32; Samson Aiko-
vich Kazarian, Zverinetskaya ul. 14, kv. 54; and Leonid
Irshevich Kattel, 1 Monetchikovsky per. 8 kv. 71, all
of Moscow, U.S.S.R.
Filed Oct. 24, 1968, Ser. No. 770,217
Int. Cl. H02b 1/04
U.S. Cl. 317—99   4 Claims

ABSTRACT OF THE DISCLOSURE

A multistage frame tower for installation of H.T. electrical equipment, preferably banks of condensers is, formed by horizontal metal frames interconnected by uprights, the frame tower featuring high insulating properties and sufficient rigidity which is achieved by the fact that the uprights of each of the stages are divided along the height into component members one of which is essentially an insulator.

---

The present invention relates to multistage frame towers for installation of operating H.T. electrical equipment, preferably banks of condensers.

Conventional rigid metal frameworks which find wide application in construction engineering, say in constructing buildings, canot be adapted to install H.T. electrical equipment thereon, since these frameworks do not possess insulating properties.

Know in the art are frame towers whose insulating portion is made through the use of insulators with strings; however, the above-mentioned frame towers cannot be employed for installation of H.T. electrical equipment such as a recovery voltage bank of condensers with a voltage exceeding 345 kv., since said frame towers feature low insulating ability and insufficient rigidity and, consequently, a reduced number of stages.

It is an object of the present invention to eliminate the above-mentioned disadvantages.

The main object of the present invention is to provide a multistage frame tower that has high insulating properties and sufficient rigidity.

These objects are accomplished by the fact that in a multistage frame tower formed by horizontal metal frames which are rigidly interconnected by uprights, the latter are divided along the height into component members, at least one of which is essentially an insulator, whereas another is a metal one; moreover, to provide for a uniform distribution of vertical load, elastic packings are placed between the component members of each upright.

Such a construction of a multistage frame tower imparts high insulating properties thereto, retains its rigidity and allows a bank of condensers with a voltage of up to 600 kv. to be installed thereon.

Figure 3:
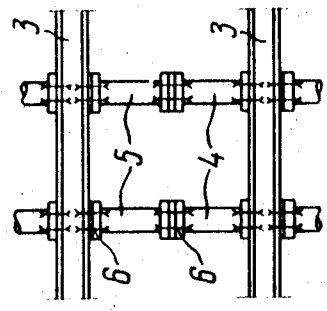
Figure 2:
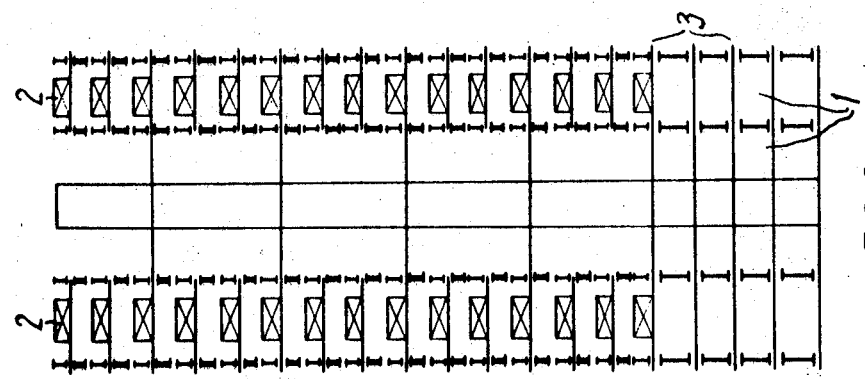
Figure 1:
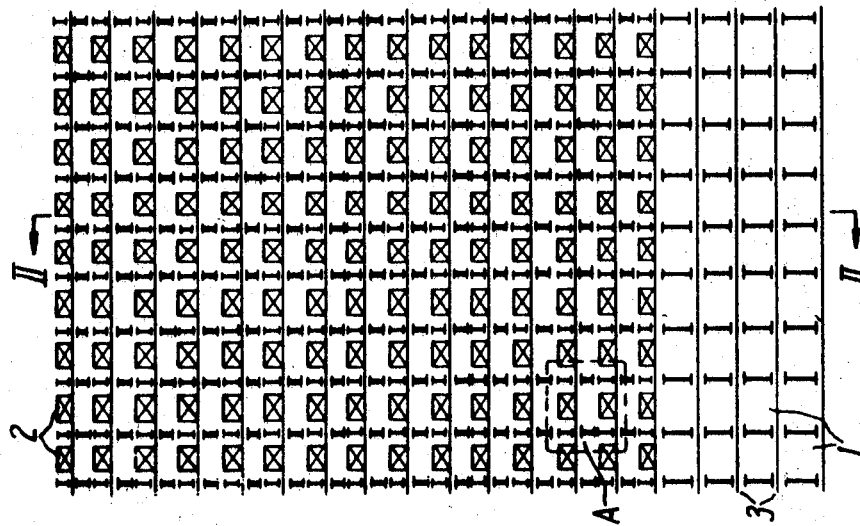

The invention will be hereinafter described by way of an exemplary embodiment of a multistage frame tower for installation of H.T. electrical equipment with due reference to the accompanying drawings, wherein:

FIG. 1 is a front view of a multistage frame tower;
FIG. 2 is a sectional view in FIG. 1 taken on the line II—II; and
FIG. 3 is an enlarged detail at A of FIG. 1.

As it is clearly seen from FIGS. 1 and 2, the frame tower features stages 1 which accommodate banks of condensers 2 (in the hereindescribed embodiment each stage accommodates 18 condensers each weighing approximately 700 kg.). A plurality of the lower stages serve as a support for all condensers to be installed on the entire frame tower.

Each stage 1 of the frame tower is formed by horizontal steel frames 3 adapted to accommodate the condensers 2, and by support uprights which are made composite, the lower portion 4 (FIG. 3) of each upright being made of metal, whereas upper portion 5 is essentially a porcelain insulator. The metal portion 4 of the upright provides the possibility for insulators or other electrical equipment to be fastened to said upright in the horizontal direction. Moreover, at all contacting places between porcelain and steel an elastic flat packing 6, such as a synthetic flexible plastic material is provided which insures uniform distribution of vertical load over the entire surface of the porcelain involved. The insulating portion 5 of the upright and the elastic packing 6 may be made of other materials.

What is claimed is:
1. A multistage frame tower for installation of H.T. electrical equipment, preferably banks of condensers, comprising: a plurality of superposed horizontal metal frames, and structural uprights interconnecting said metal frames to form a rigid structure with successive stages in the frame tower between successive horizontal frames, the electrical equipment being at each of the uppermost stages, a portion of each of the uprights within each stage which accommodates the electrical equipment being essentially constituted as an insulator, whereas the other portion of the upright in the same stage is made of metal, an elastic packing being placed between said portions.

2. A multistage frame tower as claimed in claim 1, whierein said elastic packings are flat.

3. A multistage frame tower as claimed in claim 1, wherein said portions are in coaxial alignment.

4. A multistage frame tower as claimed in claim 3, wherein the insulator portion is the upper portion and the metal portion is the lower portion, said portions being coupled to form a rigid composite structural column connecting said frames.

References Cited
UNITED STATES PATENTS

| 1,821,803 | 9/1931 | Haefely | 317—260 |
|---|---|---|---|
| 2,175,778 | 10/1939 | Mackinnon | 52—721 X |
| 2,623,094 | 12/1952 | Markley | 174—201 X |
| 3,080,506 | 3/1963 | Minder | 317—99 X |
| 3,265,934 | 8/1966 | Cuttino | 317—99 |

LARAMIE E. ASKIN, Primary Examiner
G. P. TOLIN, Assistant Examiner

U.S. Cl. X.R.
52—721; 317—103